No. 625,373.  Patented May 23, 1899.
K. WIDMANN.
AUTOMATIC LUBRICATOR FOR LOOSE PULLEYS.
(Application filed July 14, 1898.)

(No Model.) 2 Sheets—Sheet 1.

Witnesses:
Julius Lutz
Isaac B. Owens

Inventor:
Karl Widmann.
By Munn & Co
Attorneys.

No. 625,373. Patented May 23, 1899.
K. WIDMANN.
AUTOMATIC LUBRICATOR FOR LOOSE PULLEYS.
(Application filed July 14, 1898.)
(No Model.) 2 Sheets—Sheet 2.
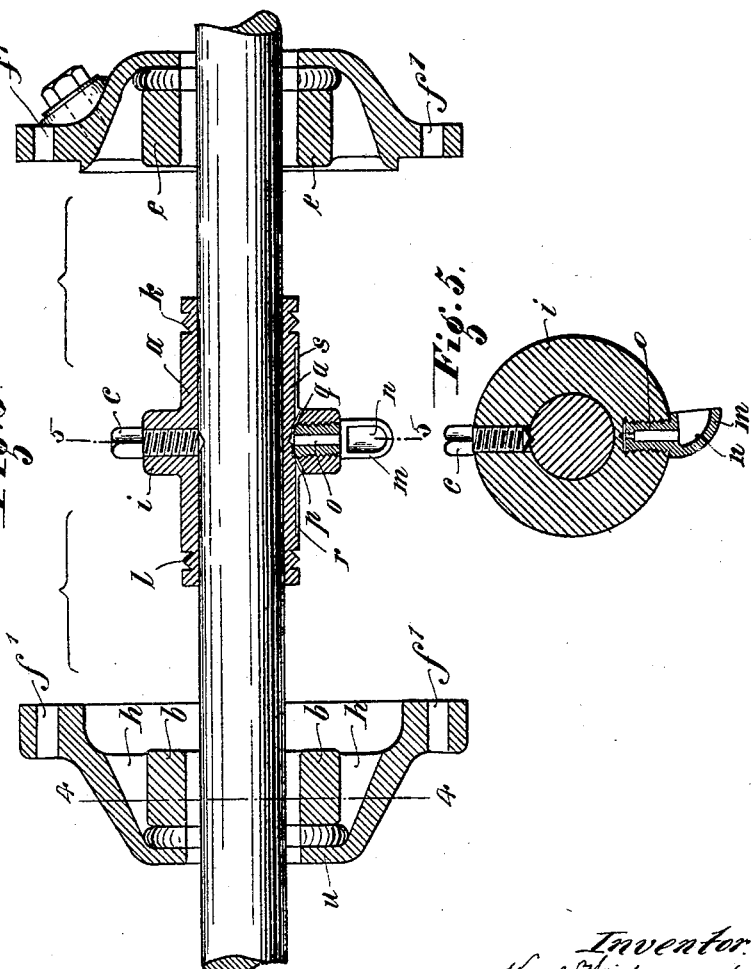
Witnesses.
Inventor.
Karl Widmann
By Attorneys.

United States Patent Office.

KARL WIDMANN, OF PATTENDORF, AUSTRIA-HUNGARY.

AUTOMATIC LUBRICATOR FOR LOOSE PULLEYS.

SPECIFICATION forming part of Letters Patent No. 625,373, dated May 23, 1899.

Application filed July 14, 1898. Serial No. 685,929. (No model.)

*To all whom it may concern:*

Be it known that I, KARL WIDMANN, a subject of the King of Würtemberg, residing in Pattendorf, near Vienna, Austria-Hungary, have invented certain new and useful Improvements in Automatic Lubricators Serving also as a Means for Securing Loose Driving-Pulleys, of which the following is a specification.

This invention relates to a lubricator for loose pulleys, and is especially adapted to those pulleys which are driven at very high speeds, being of that class in which the hub of the pulley is formed with an oil cavity or chamber therein which contains the lubricant, thus causing it to be continually in contact with the revolving parts.

This specification is the disclosure of one form of my invention, while the claims define the actual scope thereof.

Reference is to be had to the accompanying drawings, forming a part of this specification, in which similar characters of reference indicate corresponding parts in all the figures.

Figure 1:
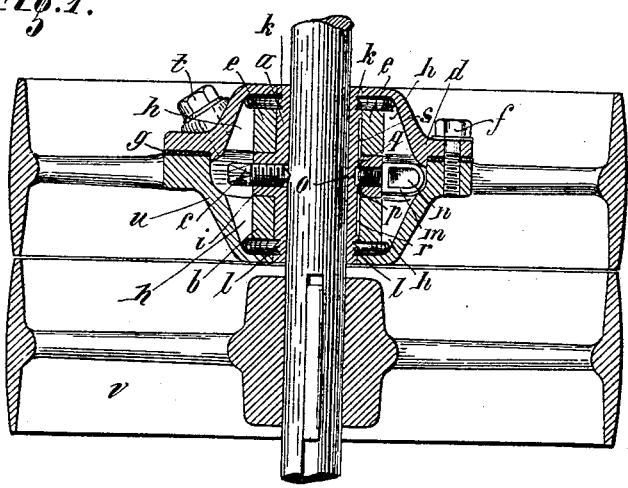
Figure 2:
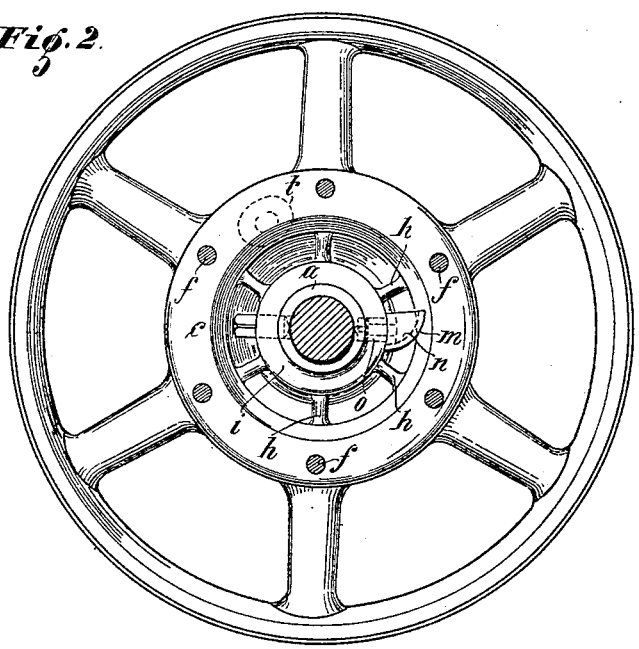

Figure 1 is a sectional view of the invention, taken on the line of the shaft. Fig. 2 is an elevational view with a part of the hub of the pulley removed to disclose the interior parts, the view showing the shaft in cross-section. Fig. 3 is a sectional view of some of the parts in disassembled position. Fig. 4 is a detail section on the line 4 4 of Fig. 3, and Fig. 5 is a similar view on the line 5 5 of Fig. 3.

On the shaft is mounted a sleeve $a$, formed with an annular rib $i$, through which passes a set-screw $c$ to rigidly hold the sleeve on the shaft. An oil-cup $m$, having a cavity $n$ therein, is made fast to the rib $i$ opposite the screw $c$ by means of a tubular threaded stem $o$, screwed into the rib. Each end of the sleeve is provided with annular grooves $l$ and $k$ for the purpose of promoting the circulation of the lubricant. The hollow stem $o$ leads the oil from the cavity $n$ of the cup $m$ inward to ducts $p$ and $q$, formed in the rib $i$, such ducts in turn leading to concavities $r$ and $s$, formed in the outer surface of the sleeve $a$ and extending partly around the same, as indicated in Figs. 1 and 3.

The loose pulley has its hub formed in two sections, the one of which $u$ is fast to the spokes and the other of which is in the form of a cap $d$, secured to the main section by bolts $f$, fitting in holes $f'$. Packing $g$ may be imposed to secure a hermetic connection. Formed on the sections $u$ and $d$ of the hub are radially-disposed arms $h$, projecting inward and carrying for the respective hub-sections rings $b$ and $e$, which bear on the sleeve $a$, respectively on the sides of the rib $i$, such rings serving to cover the concavities $r$ and $s$. These rings carry the weight of the pulley, and the true bearing is between the rings and the sleeve. Consequently it is necessary to lubricate these parts. The oil is introduced in the hollow hub by means of an opening, which may be closed by a screw $t$.

As the pulley revolves the oil in the cavity is thrown outward by centrifugal force and carried around with the pulley. The movement of the oil is interrupted, however, by the cup $m$, which serves to keep the oil in a constant state of agitation, throwing it sidewise into the lateral extremities or ends of the hollow hub and causing it to be effectively applied to all of the engaging surfaces. The oil is also led through the hollow stem $o$ to the ducts $p$ and $q$ and to the concavities $r$ and $s$, which serves to lubricate the inner faces of the rings $e$ and $b$.

In the drawings I have shown a pulley $v$, fast to the shaft alongside of the loose pulley, which illustrates the application of my invention.

What I claim, and desire to secure by Letters Patent of the United States, is—

1. The combination of a shaft, a sleeve fast thereon, a dripping-cup carried by the sleeve, and a pulley having a hub formed in two hollow sections, each with a ring loosely mounted on the sleeve and forming an oil-chamber through which the dripping-cup moves.

2. The combination of a shaft, a sleeve fast thereto, a dripping-cup carried by the sleeve, and a pulley having a hub formed in two sections, the hub being loosely mounted on the sleeve, and each section having a ring encircling the sleeve and joined to the respective sections by radially-disposed arms.

3. The combination of a sleeve adapted to be made fast to a shaft and having an annular rib intermediate its ends, a pulley, the hub of which is hollow to inclose the sleeve and its rib, an oil-cup fast to the rib of the sleeve, arms rigidly attached to the pulley within the cavity of the hub, and rings carried by the arms and bearing on the sleeve respectively on the sides of the rib.

4. In a lubricator, the combination of a sleeve adapted to be secured to a shaft and having an annular rib formed thereon, the rib having two ducts leading in opposite directions and the sleeve having two concavities in its outer surface respectively in communication with said ducts, an oil-cup having a hollow stem fitted in the rib and communicating with the ducts thereof, and a pulley having a hollow hub adapted to contain the lubricant, the hub being mounted loose on the sleeve to inclose the rib and the oil-cup.

5. The combination of a sleeve having an annular rib intermediate the ends thereof, the rib having two oil-ducts leading toward the ends of the sleeve and the sleeve having two concavities in its outer face respectively in communication with the ducts, a pulley, the hub of which is formed in two hollow sections, such hub loosely encircling the sleeve, arms carried rigidly by each section of the hub within the hub, and two rings respectively supported by the arms of each hub-section, the rings bearing loosely on the sleeve at opposite sides of the rib, to support the pulley.

6. The combination of a sleeve, a dripping-cup carried by the sleeve, and a pulley having a hub formed in two hollow sections, each with a ring loosely mounted on the sleeve and forming an oil-chamber through which the dripping-cup moves.

7. The combination of a sleeve, a dripping-cup carried by the sleeve, and a pulley having a hub formed in two hollow sections joined to each other and mounted loosely on the sleeve and forming an oil-chamber, the oil in which is agitated by the dripping-cup.

8. The combination of a sleeve, a pulley, the hub of which is formed with two hollow sections joined to each other, and rings respectively carried by the sections of the hub and mounted on the sleeve to turn around the same, whereby to support the pulley on the sleeve.

9. The combination of a sleeve, a pulley, the hub of which is hollow to form a closed oil-chamber, and a ring carried within the hollow hub and mounted on the sleeve to support the pulley.

In witness whereof I have hereunto signed my name, this 24th day of June, A. D. 1898, in the presence of two subscribing witnesses.

KARL WIDMANN.

Witnesses:
HENRY C. CARPENTER,
CHAS. E. CARPENTER.